(12) United States Patent
Morris et al.

(10) Patent No.: US 9,724,628 B2
(45) Date of Patent: Aug. 8, 2017

(54) FUEL WATER SEPARATOR HAVING FILTER AND SENSOR

(71) Applicant: Caterpillar Inc., Peoria, IL (US)

(72) Inventors: Bryant Morris, Peoria, IL (US); Darrell L. Morehouse, III, Dunlap, IL (US); Jeffrey R. Ries, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 496 days.

(21) Appl. No.: 14/329,084

(22) Filed: Jul. 11, 2014

(65) Prior Publication Data

US 2016/0008749 A1   Jan. 14, 2016

(51) Int. Cl.
| | | |
|---|---|---|
| *B01D 35/00* | (2006.01) | |
| *B01D 36/00* | (2006.01) | |
| *B01D 29/11* | (2006.01) | |
| *F02M 37/22* | (2006.01) | |
| *G01F 23/26* | (2006.01) | |

(52) U.S. Cl.
CPC ............ *B01D 35/005* (2013.01); *B01D 29/11* (2013.01); *B01D 36/005* (2013.01); *F02M 37/221* (2013.01); *B01D 2201/295* (2013.01); *G01F 23/268* (2013.01)

(58) Field of Classification Search
CPC .................................................. B01D 36/005
See application file for complete search history.

(56) References Cited

U.S. PATENT DOCUMENTS

| | | |
|---|---|---|
| 4,476,028 A | 10/1984 | Harris |
| 4,497,714 A | 2/1985 | Harris |
| 7,485,219 B2 | 2/2009 | Urbahn et al. |

FOREIGN PATENT DOCUMENTS

| | | | |
|---|---|---|---|
| DE | 102008043197 | 4/2010 | |
| DE | 102012221890 A1 * | 6/2014 | ........... B01D 36/005 |
| EP | 1163944 | 12/2001 | |
| KR | 2008106231 A | 12/2008 | |

OTHER PUBLICATIONS

Machine English translation of DE 10201221890 description.*

* cited by examiner

*Primary Examiner* — Terry Cecil
(74) *Attorney, Agent, or Firm* — Bart A. Fisher

(57) ABSTRACT

A fuel water separator is provided. The fuel water separator includes a filter having a top end cap and a bottom end cap. A sensor is coupled to the top end cap of the filter. A probe is configured to be coupled to the sensor and to the bottom end cap. The probe is configured to be positioned outside the filter between the top end cap and the bottom end cap.

9 Claims, 10 Drawing Sheets

FUEL WATER SEPARATOR HAVING FILTER AND SENSOR

TECHNICAL FIELD

This patent disclosure relates generally to fuel water separators, and more particularly, to a fuel water separator having a sensor and a filter.

BACKGROUND

Conventional fuel-water separators (FWS) have a water-in-fuel-filter ("Wiff") sensor, which indicates whether a bowl at the bottom of the filter is full of water and needs to be drained. The sensor is attached by a wire to the bottom of the filter. This sensor has to be disconnected in order from the filter and reconnected when the new filter is installed. In addition to the fact that it can be a hassle to remove/install the sensor, conventional fuel-water separators in which the sensor has to be disconnected and then reconnected have several drawbacks including that sometimes the sensor is not reattached, and the length of the wire given may make it challenging to install/remove the sensor. One such liquid sensor is disclosed in the Korean Patent Publication No. 2008106231.

Accordingly, there is a need to resolve these and other problems related to conventional fuel-water separator sensors.

SUMMARY

In one aspect, a fuel water separator is provided. The fuel water separator includes a filter having a top end cap and a bottom end cap. A sensor is coupled to the top end cap of the filter. A probe is configured to be coupled to the sensor and to the bottom end cap. The probe is configured to be positioned outside the filter between the top end cap and the bottom end cap.

In another aspect, a filter is provided. The filter includes a top end cap configured to couple to a sensor. A probe including a pair of prongs is provided and is configured to be coupled to the sensor at the top end cap. The filter includes a bottom end cap configured to separate an end of the pair of prongs. The filter includes a filter material between the top end cap and the bottom end cap.

In yet another aspect, a fuel water separator is provided. The fuel water separator includes a filter base, a housing coupled to the filter base, a sensor coupled to the filter base above an upper end of the housing, the upper end coupling the housing to the filter base, a probe coupled to the sensor, and a filter inside the housing. The filter includes a top end cap coupled to the sensor via a pair of connectors to the probe and a bottom end cap configured to separate ends of the probe, said probe being outside the filter.

DETAILED DESCRIPTION

Figure 1:
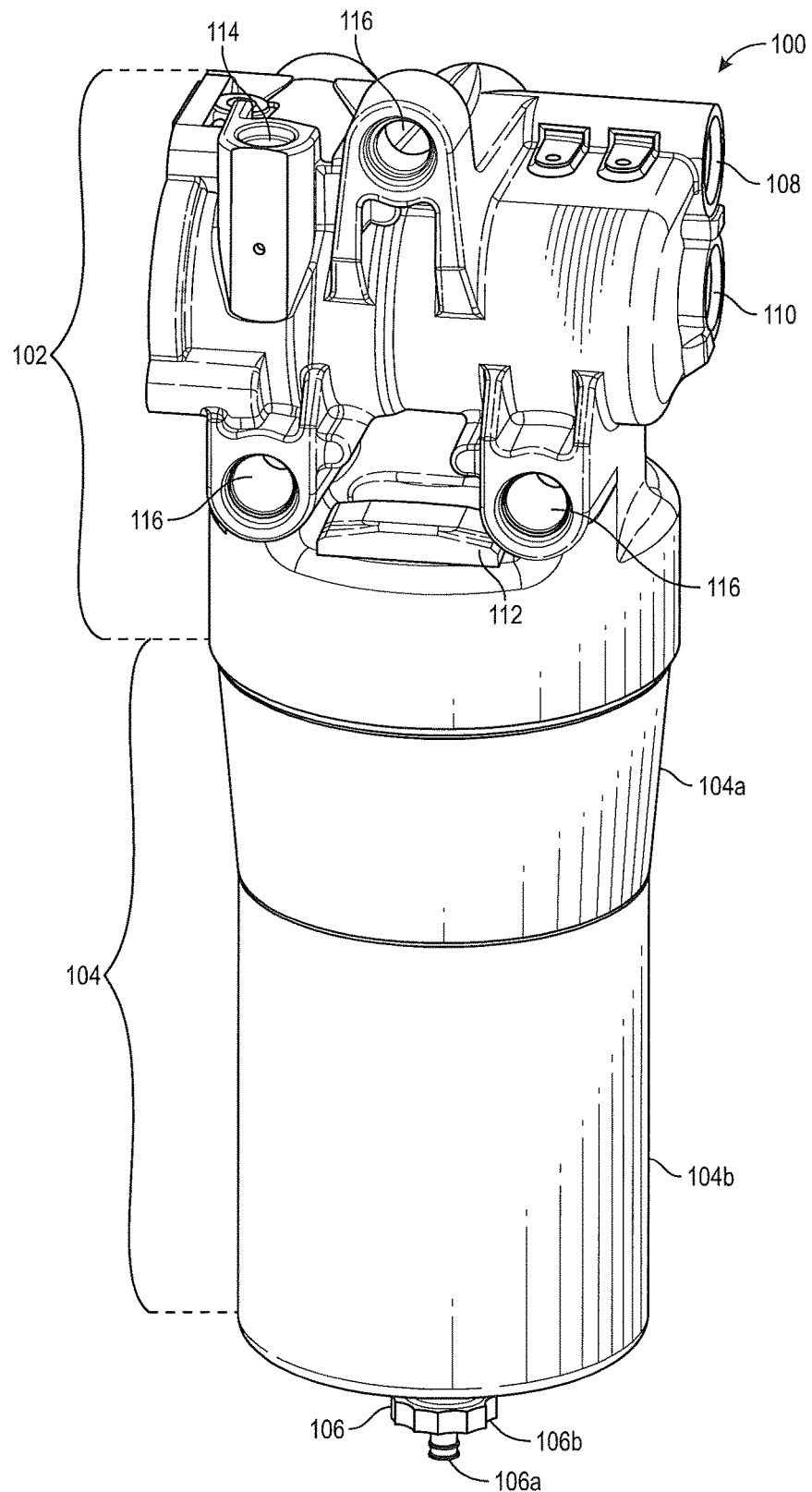
FIG. 1 illustrates a fuel water separator, in accordance with an aspect of this disclosure.

Now referring to the drawings, wherein like reference numbers refer to like elements, there is illustrated in FIG. 1 a fuel water separator 100, in accordance with an aspect of this disclosure. The fuel water separator 100 may be made of hard plastic or metallic material, although other types of materials may be used. In one aspect, the fuel water separator 100 may include a filter base 102, a housing 104, a drain 106, a sensor 112, and a filter 200 (discussed with respect to FIG. 2).

The filter base 102 may include an inlet 108 and an outlet 110. The inlet 108 is configured to receive a fuel and/or a fuel mixture into the fuel water separator 100. The fuel and/or the fuel mixture is filtered by the fuel water separator 100 and exits at the outlet 110 from where it may go to other components of a machine inside which the fuel water separator 100 may be installed. The fuel and/or the fuel mixture may have impurities such as water or other liquids that the fuel water separator 100 is configured to remove. In one aspect, the filter base 102 may include additional components, for example a port 114 through which the wires run to connect to a priming pump (not shown) in the filter base 102.

The filter base 102 may include a plurality of bolt holes 116 configured to attach the fuel water separator 100 to a machine or a component of the machine. It is to be noted that although three of the plurality of bolt holes 116 are illustrated in FIG. 1, the filter base 102 may have a higher or a lower number of the plurality of bolt holes 116. In one aspect, the filter base 102 may support one or more sensors, for example, the sensor 112 shown coupled to the filter base 102. Although the sensor 112 is illustrated to be attached between two of the plurality of bolt holes 116, the sensor 112 may be provided at other places on the filter base 102, for example, near or next to other types of sensors. The filter base 102 may include a cutout portion (not shown) through which the sensor 112 is inserted.

Figure 4:
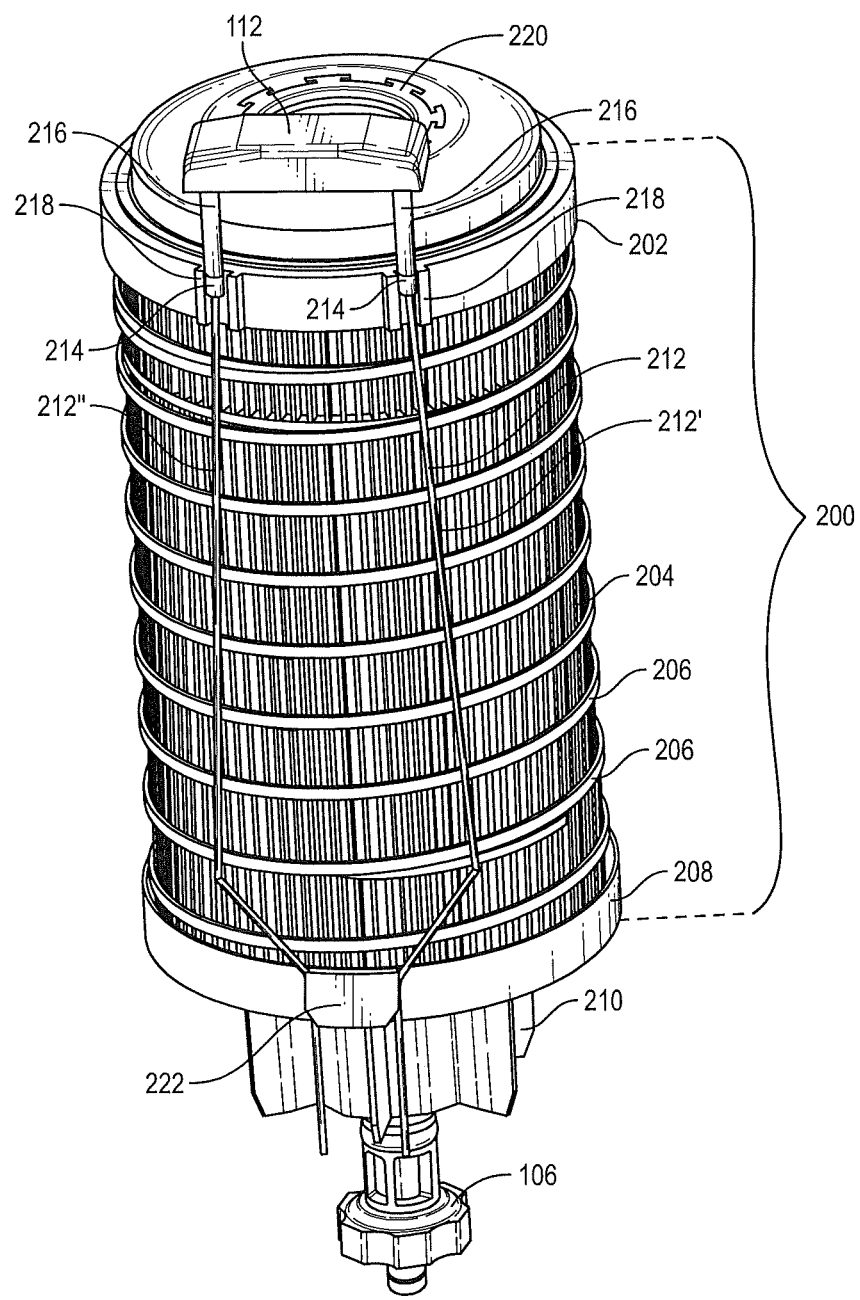
FIG. 4 illustrates a filter with the sensor of the fuel water separator of FIG. 1, in accordance with an aspect of this disclosure.

In one aspect, the housing 104 may include an upper end 104a and a lower end 104b. The upper end 104a couples the housing 104 to the filter base 102. The lower end 104b is coupled to the drain 106. In one aspect, the housing 104 may be electrically conductive. In another aspect, the housing 104 may be electrically non-conductive. As illustrated in FIG. 4, the housing 104 includes the filter 200 and a probe 212. The drain 106 includes a channel 106a and a screw 106b. The screw 106b may be turned to drain out water from the fuel and/or the fuel water mixture entering the fuel water separator 100.

The sensor 112 may be an electrical sensor that is configured to be activated when water in a bowl (not shown) of the fuel water separator 100 coupled to the lower end 104b of the housing 104 fills up with water or other undesired fluid in the fuel and/or fuel mixture entering from the inlet 108. In one aspect, the sensor 112 may include an output indicator configured to output an audio and/or an optical signal indicating that the fuel water separator 100 needs to be checked, for example, when a water level has reached a predetermined threshold. The sensor 112 may be powered by a power source, for example, a battery (not shown). Alternatively, the sensor 112 may be a passive sensor that changes a property based upon an amount of water filling up in a bowl under the fuel water separator 100. For example, such a passive sensor may indicate a change in the pH value when water in the bowl reaches a certain level and touches an end of the sensor 112. In one aspect, the sensor 112 may be configured to detect a conductivity differential between the fuel (e.g., diesel) entering the fuel water separator 100 and water.

It is to be noted that although the term "fuel water" is being used with respect to the fuel water separator 100, the fuel water separator 100 may be configured to separate any fluid and/or fluid impurity from the fuel and/or the fuel mixture entering via the inlet 108. In one aspect, the fuel water separator 100 may be included inside a machine. Alternatively, the fuel water separator 100 may be attached to an outside surface of a machine and be directly visible to a user. By way of example only and not by way of limitation, such a machine may be a medium wheel loader, a large wheel loader, a medium track-type tractor, a large track-type tractor, an off-highway truck, a large mining truck, a wheel tractor scraper, a motor grader, an articulated truck, a hydraulic excavator, an electric rope shovel, a dragline, a power generation machine, an industrial/waste machine, a vehicle, an earth-moving machine, an airplane engine, a ship, a submarine, a space craft, or subcomponents thereof.

Figure 2:
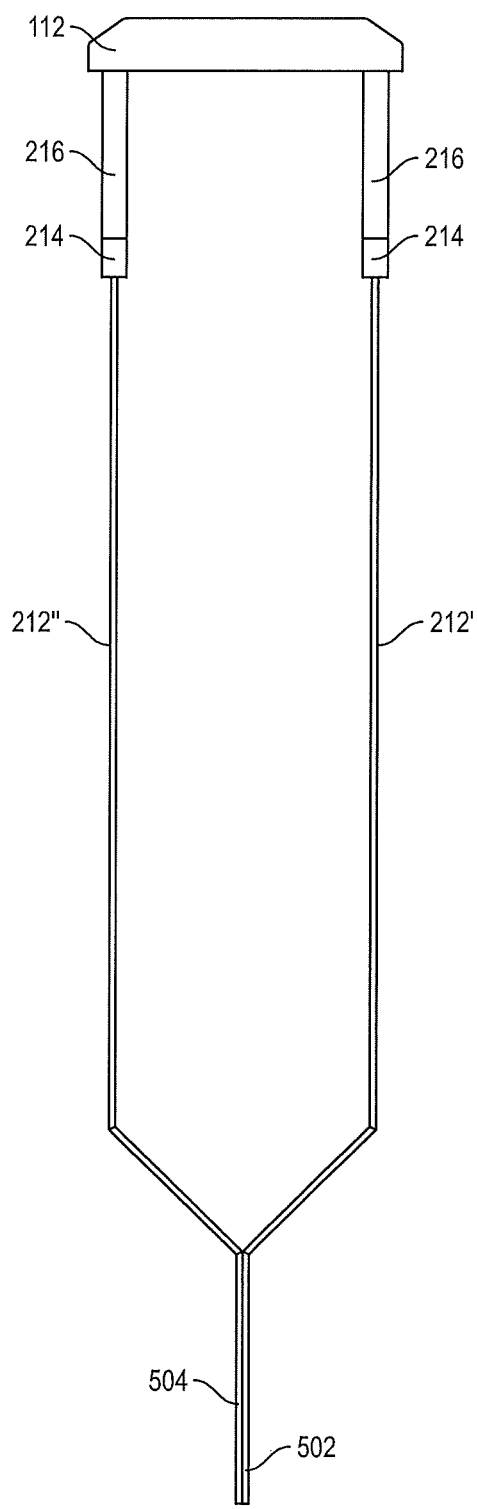
FIG. 2 illustrates a sensor, shown in a standalone view, as attached to a probe of the fuel water separator of FIG. 1 with the ends of the probe contacted with each other, in accordance with an aspect of this disclosure.

Referring to FIG. 2, a probe 212 coupled to the sensor 112 is illustrated with the housing 104 and the filter base 102 removed, in accordance with an aspect of this disclosure. The probe 212 includes a first prong 212' and a second prong 212" arranged to contact each other at ends 502, 504, respectively, in the absence of the filter 200. In one aspect, the sensor 112 may couple to the first prong 212' and a second prong 212" via a pair of terminals 216 at a pair of connectors 214. The first prong 212' and the second prong 212" go down along the housing 104 and have a natural spring set which keeps the first prong 212' and the second prong 212" contacted at the ends 502, 504, respectively, when the filter 200 is not inserted into the housing 104. Such contacting of the first prong 212' and the second prong 212" at the ends 502, 504, respectively, trips the sensor 112 and lets an operator of the fuel water separator 100 know that the filter 200 may need to be checked for proper installation and/or whether the filter material 204 or the filter 200 are missing altogether. In one aspect, a length of the first prong 212' and the second prong 212" can be varied depending upon a type or a rating of the filter 200.

Figure 3:
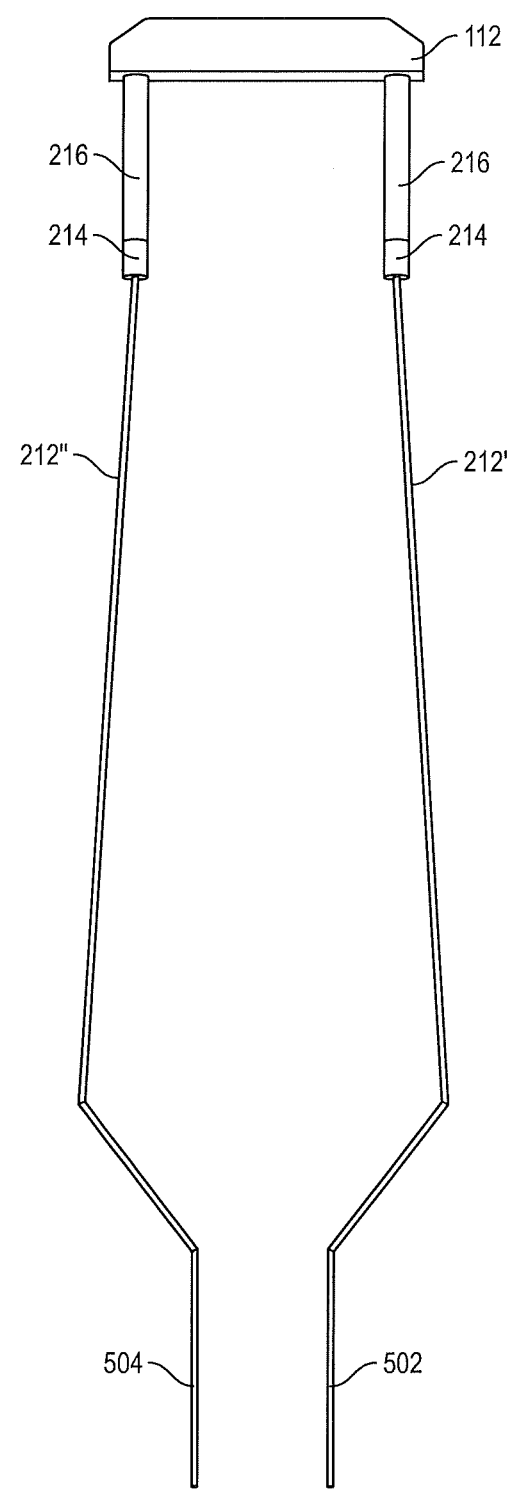
FIG. 3 illustrates the sensor of FIG. 2 attached to the probe with the ends of the probe separated, in accordance with an aspect of this disclosure.

Referring to FIG. 3, the probe 212 is illustrated with the first prong 212' and the second prong 212" arranged to be separated from each other at the ends 502, 504, respectively. In one aspect, a spacing element 222 (discussed with respect to FIG. 4) may separate the ends 502, 504 when the filter 200 is present in the fuel water separator 100. When the ends 502, 504 are separated due to a presence of the filter 200; the first prong 212' and the second prong 212" deviate or bend from their respective natural spring sets.

Referring to FIG. 4, the filter 200 is illustrated, in accordance with an aspect of this disclosure. In one aspect, the housing 104 may be configured to accommodate or include the filter 200. The filter 200 may include a top end cap 202, a filter material 204, and a bottom end cap 208. The filter material 204 is positioned between the top end cap 202 and the bottom end cap 208. The filter material 204 may be fiber based or metallic wire based and may include rovings 206 to maintain a shape of the filter material 204. FIG. 4 further illustrates the probe 212 configured to be positioned outside the filter 200. For example, the probe 212 may run between the top end cap 202 and the bottom end cap 208, for example, along a side of the filter material 204. One end of both the first prong 212' and the second prong 212" may extend beyond the bottom end cap 208 into a bowl 1302 (discussed with respect to FIG. 13) where the water may collect, while the other end may terminate at the pair of connectors 214, shown as cylindrical heads in FIGS. 2-4, by way of example only. The first prong 212' and the second prong 212" may be of equal length. Alternatively, the first prong 212' and the second prong 212" may be of unequal length. The first prong 212' and the second prong 212" may be may be made of conductive material. In another aspect, the probe 212 may include a single element configured to detect a water level and communicate with the sensor 112 regarding such a detection.

In one aspect, the top end cap 202 may be coupled to the sensor 112. Such coupling may be via the pair of connectors 214 of the probe 212 coupled to the pair of terminals 216 of the sensor 112. In one aspect, the pair of connectors 214 of the probe 212 couple to the pair of terminals 216 at a pair of protrusions 218 of the top end cap 202. The top end cap 202 may be made of hard plastic material, although other types of suitable materials could be used. The top end cap 202 may include a seal 220 to attach to the filter base 102 (not shown in FIG. 2).

Figure 5:
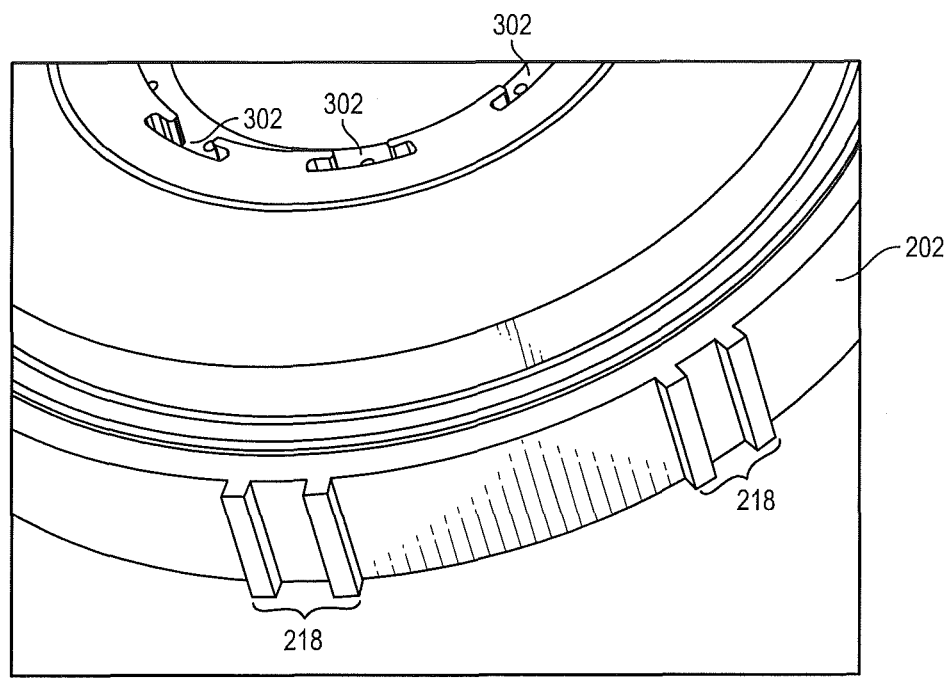
FIG. 5 illustrates a top end cap of the filter of FIG. 4, in accordance with an aspect of this disclosure

Referring to FIG. 5, a portion of the top end cap 202 is illustrated, in accordance with an aspect of this disclosure. The top end cap 202 may include recesses 302 to accommodate the seal 220. Further, the pair of protrusions 218 are illustrated with the probe 212 removed. It is to be noted that although only two of the pair of protrusions 218 are illustrated, the top end cap 202 may include additional or only one protrusion, depending on a number of probes similar to the probe 212 included in the fuel water separator 100. In yet another aspect, other types of mechanisms may be used to attach the probe 212 to the top end cap 202. By way of example only and not by way of limitation, such mechanisms may be mechanical, magnetic, or both. For example, one or more guide through holes may be present instead of the pair of protrusions 218 to hold the probe 212. Likewise, one or more permanent magnets may be present to hold the probe 212.

Referring back to FIG. 4, the first prong 212' and the second prong 212" may be spaced apart by the filter 200. For example, a spacing element 222 on the bottom end cap 208 of the filter 200 may mechanically separate the first prong 212' and the second prong 212" of the probe 212. The bottom end cap 208 may be coupled to a fin element 210 configured to couple the filter 200 to the drain 106. The fin element 210 may be rotatable to aid in a removal of the filter material 204 and/or the filter 200 from the housing 104.

Figure 6:
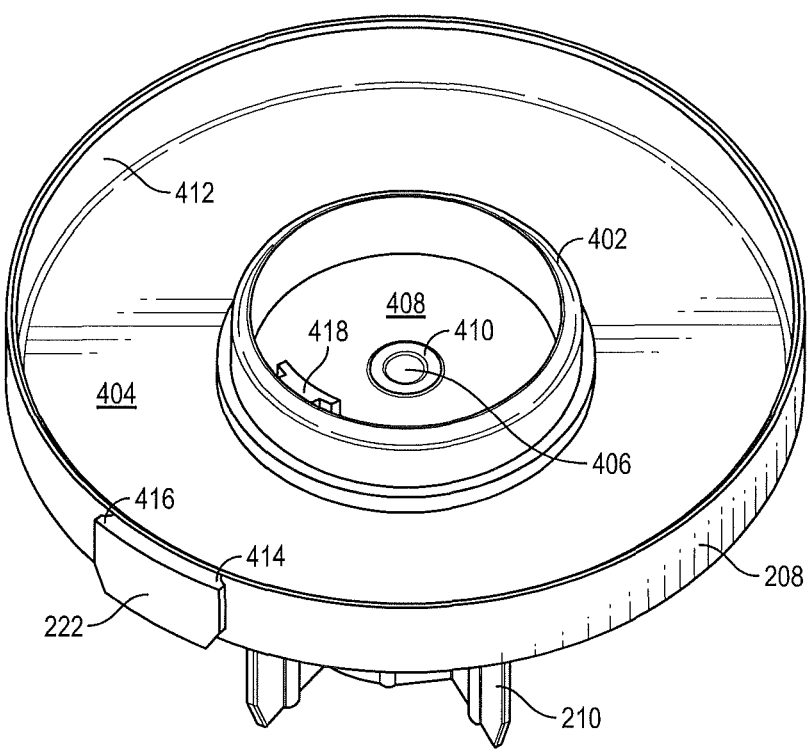
FIG. 6 illustrates a bottom end cap of the filter of FIG. 4, in accordance with an aspect of this disclosure.

Referring to FIG. 6, the bottom end cap 208 is illustrated, in accordance with an aspect of this disclosure. The bottom end cap 208 may include a first region 404 between a wall 412 and a wall 402 in which the filter material 204 is placed. The filter material 204 may be in a cylindrical shape having an annular ring cross section, as may be understood by one of ordinary skill in the art. An area of the cross section may be less than or equal to an area of the first region 404. The bottom end cap 208 may include a second region 408 between the wall 402 and a ring 410 in which water and/or impurities may collect prior to or during drainage to a hole 406 coupled to the drain 106. The spacing element 222 may include indentations 414, 416 to accommodate the first prong 212' and the second prong 212", respectively, in a secure manner. In another aspect, similar to the spacing element 222, an inner spacing element 418 may be provided on the wall 402. The inner spacing element 418 may be configured to separate the first prong 212' and the second prong 212" when placed inside the filter 200, as discussed with respect to FIG. 12, for example. In yet another aspect, the inner spacing element 418 may be optional. Further, additional spacing elements similar to the spacing element 222 and/or the inner spacing element 418 may exist when more than two of the first prong 212' and the second prong 212" exist for the probe 212.

Figures 7, 8:
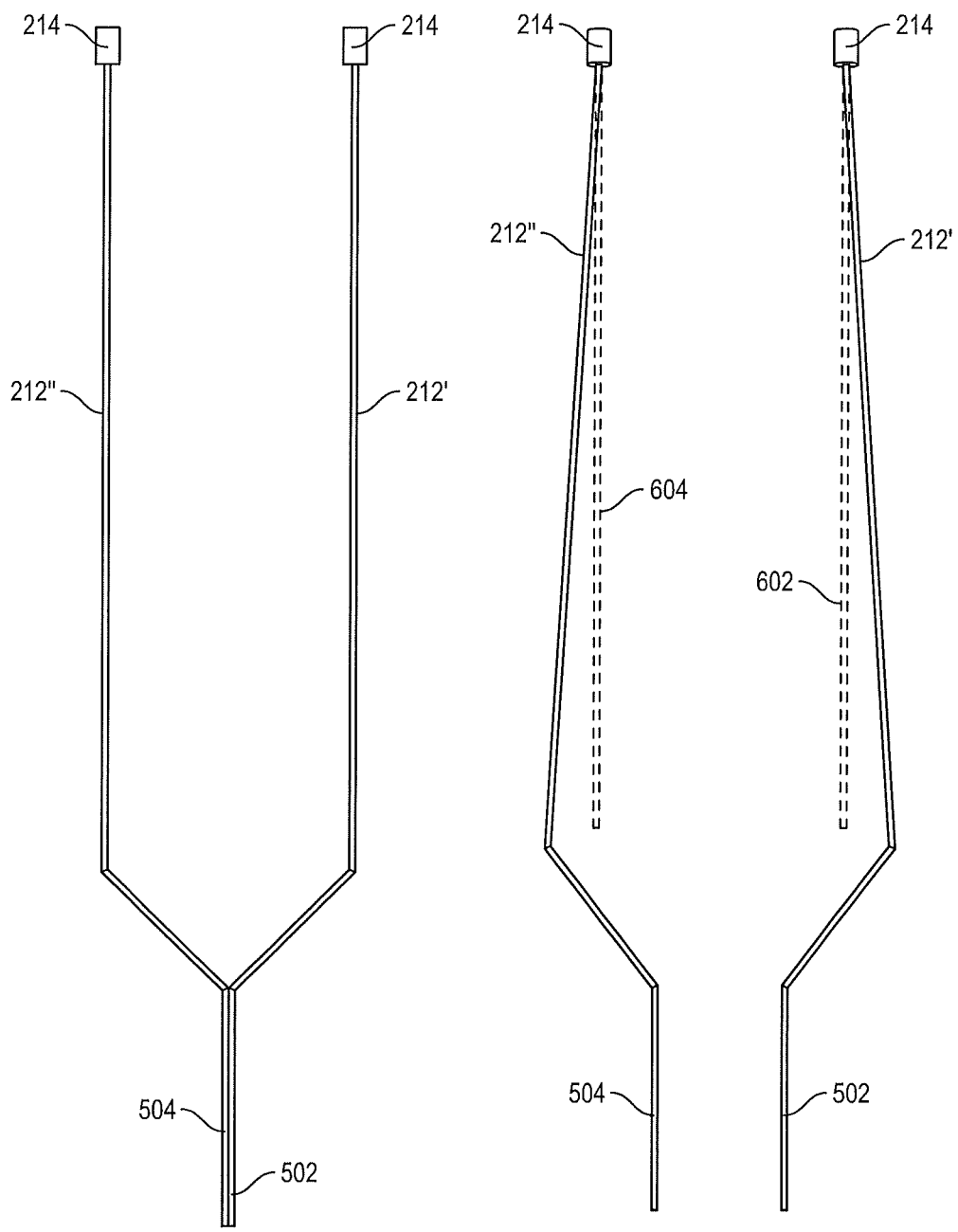
FIG. 7 illustrates a probe with ends contacted with each other, in accordance with an aspect of this disclosure.
FIG. 8 illustrates the probe of FIG. 7 having a natural spring set, in accordance with an aspect of this disclosure.

Referring to FIG. 7, the probe 212 is illustrated with the first prong 212' and the second prong 212" arranged to contact each other at ends 502, 504, respectively, in the absence of the filter 200. The first prong 212' and the second prong 212" may go down along the housing 104 and have a natural spring set which keeps the first prong 212' and the second prong 212" contacted at the ends 502, 504, respectively when the filter 200 is not inserted into the housing 104. Such contacting of the first prong 212' and the second prong 212" at the ends 502, 504, respectively, trips the sensor 112 and lets an operator or a user of the fuel water separator 100 know that the filter 200 may need to be checked for proper installation and/or whether the filter material 204 or the filter 200 are missing altogether. In one aspect, a length of the first prong 212' and the second prong 212" and the position of the spacing element 222 on the bottom end cap 208 of the filter 200 can be varied. By way of example only and not by way of limitation, the length of the first prong 212' and the second prong 212" may be based on a 10 µm or a 4 µm type of the filter material 204 such that a correct type of the filter 200 may be used in a particular application.

Referring to FIG. 8, the probe 212 is illustrated with the first prong 212' and the second prong 212" arranged to be separated from each other at ends 502, 504, respectively. As discussed, in one aspect, the spacing element 222 in the bottom end cap 208 may separate the ends 502, 504 when the filter 200 is present in the fuel water separator 100. When the ends 502, 504 are separated due to a presence of the filter 200, the first prong 212' and the second prong 212" deviate or bend from their respective natural spring sets, as indicated by lines 602 and 604, respectively. In one aspect, the first prong 212' and the second prong 212" of the probe 212 may both be insulated by a non-conductive material. For example, when the housing 104 is conductive, the first prong 212' and the second prong 212" may be covered, partially or fully, with an insulating material to avoid a short circuit with the housing 104. In one aspect, such insulation may be optional, for example, when the housing 104 is made of non-conductive material.

Figure 9:
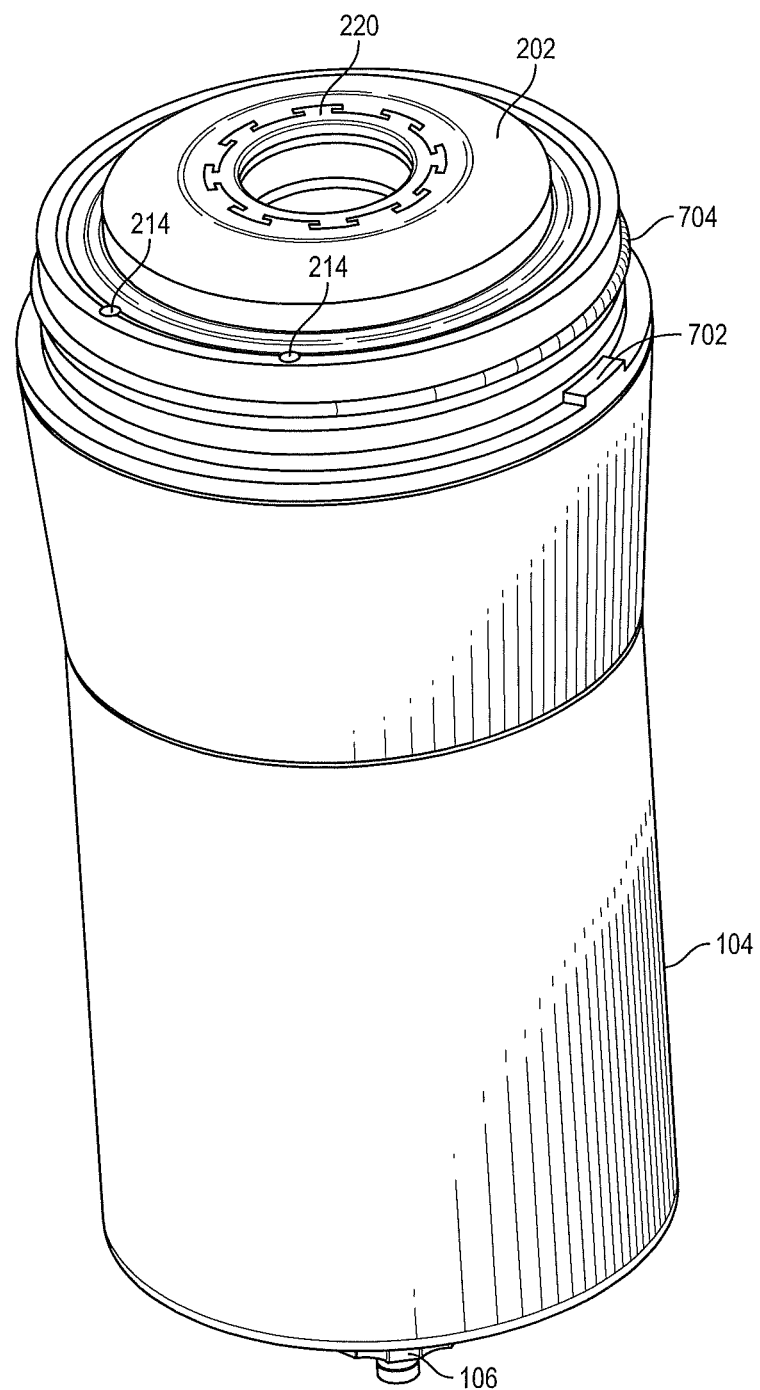
FIG. 9 illustrates the fuel water separator of FIG. 1 with a filter base removed, in accordance with an aspect of this disclosure.

Referring to FIG. 9, the fuel water separator 100 is illustrated with the filter base 102 removed, in accordance with an aspect of this disclosure. The housing 104 may include a tab 702. The tab 702 may be configured or arranged to couple the housing 104 to the filter base 102. It is to be noted that the housing 104 may include additional tabs similar to the tab 702 to couple to the filter base 102. Further, instead of the tab 702, other types of coupling devices such as latches, springs, clamps, magnetic attachments, or combinations thereof could be used. In one aspect, the housing 104 may include a seal 704 to securely position the filter base 102. In one aspect, the tab 702 may enable a user to visually see that the filter 200 has been inserted in the housing 104 in a proper orientation. FIG. 9 illustrates the pair of connectors 214 of the probe 212 protruding out of the housing 104, the pair of connectors 214 being configured to couple to the sensor 112 via the pair of terminals 216 of the sensor 112.

Figure 10:
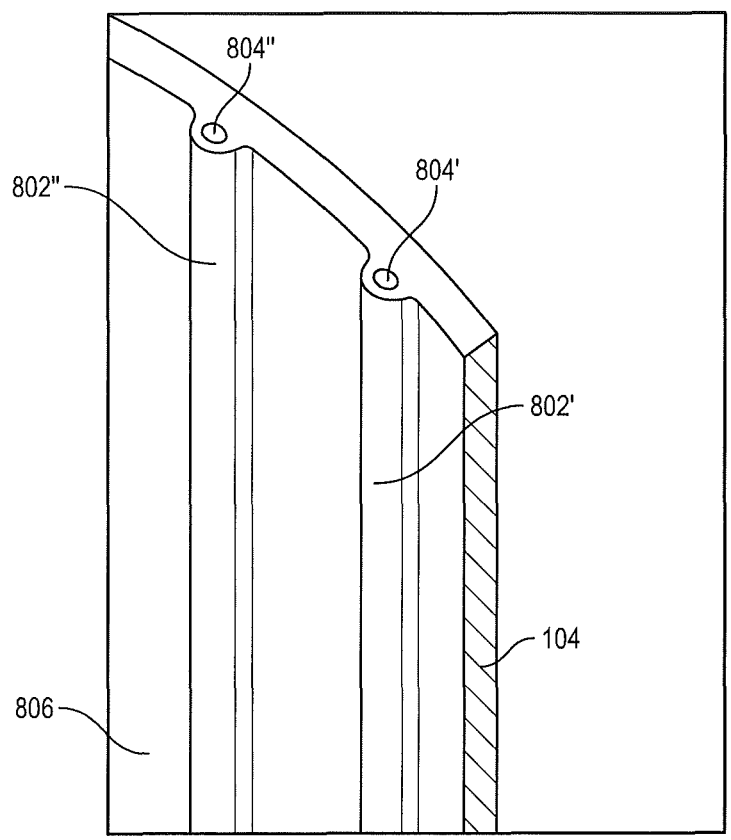
FIG. 10 illustrates a cutout view of the housing of the fuel water separator of FIG. 1, in accordance with an aspect of this disclosure.

Referring to FIG. 10, the housing 104 may include a pair of standpipes 802' and 802" on an inside surface 806 of the housing 104. The pair of standpipes 802' and 802" may include a pair of ducts 804' and 804", respectively. In one aspect, the first prong 212' may be inserted into the duct 804' and the second prong 212" may be inserted into the duct 804". When the housing 104 is made of a conductive material, the first prong 212' and the second prong 212" may each be sheathed by an insulating material (not shown) to prevent a false tripping of the sensor 112. Alternatively, an inside surface of the pair of standpipes 802' and 802" may be covered with electrically insulating material. However, when the housing 104 is made of a non-conductive material (e.g., hard plastic), the first prong 212' and the second prong 212" may be directly inserted into the pair of ducts 804' and 804", respectively, without any insulation surrounding the first prong 212' and the second prong 212". In yet another aspect, the first prong 212' and the second prong 212" may not contact the housing 104 at all and may be positioned between the filter material 204 and the housing 104.

Figure 11:
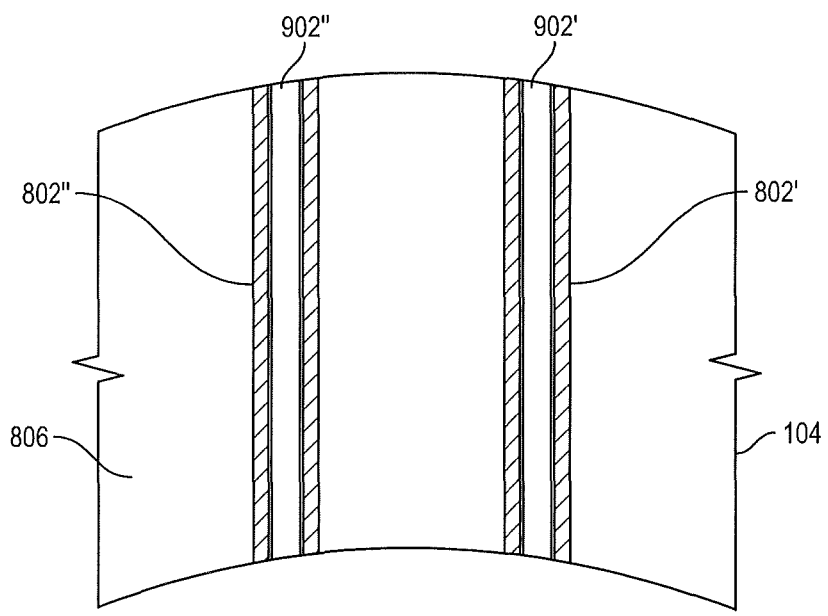
FIG. 11 illustrates ducts in the housing, in accordance with an aspect of this disclosure.

Referring to FIG. 11, a cutout view of the pair of standpipes 802' and 802" is illustrated, in accordance with an aspect of this disclosure. A first inside surface 902' of the standpipe 802' and a second inside surface 902" of the standpipe 802" may each be shaped to match a surface geometry of the first prong 212' and the second prong 212". For example, the pair of ducts 804' and 804" may each be cylindrical in shape such that the first inside surface 902' and the second inside surface 902" may be cylindrical curved surface similar to a trench. In one aspect, the pair of standpipes 802' and 802" may be removable or detachable from the inside surface 806 of the housing 104.

Figure 12:
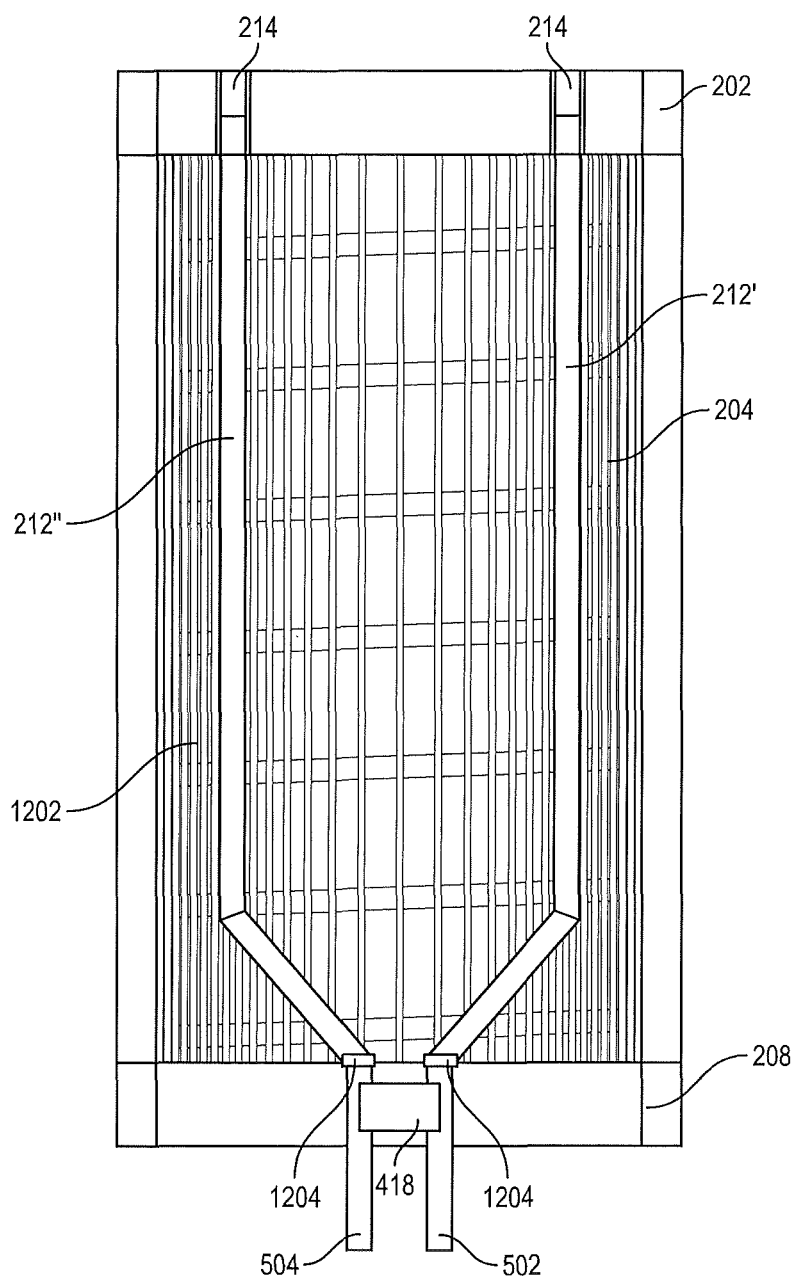
FIG. 12 illustrates the probe placed inside the filter, in accordance with an aspect of this disclosure.

Referring to FIG. 12, the first prong 212' and the second prong 212" are illustrated as placed on an inside surface 1202 of the filter material 204, shown in a cutout view, in accordance with an aspect of this disclosure. The first prong 212' and the second prong 212" at one end are coupled to the pair of connectors 214 and thus to the sensor 112 (not shown in FIG. 12). In this aspect, the ends 502 and 504 emerge out from the filter 200 from a central region of the bottom end cap 208, for example, the second region 408. The inner spacing element 418 may exist on the wall 402 facing the second region 408 and may be configured to separate the ends 502, 504 when the first prong 212' and the second prong 212" are on the inside surface 1202 of the filter material 204, as discussed, for example, with respect to FIG.

6. In one aspect, when the filter 200 and/or the filter material 204 are removed, the sensor 112 still remains with the filter base 102 and is not tampered. A new filter similar to the filter 200 with respective probe(s) may be then provided or inserted in the fuel water separator 100 without dislodging or moving the sensor 112. The first prong 212' and the second prong 212" may couple to the inner spacing element 418 at attachments 1204 on the bottom end cap 208. Alternatively, the attachments 1204 may be optional. In one aspect, the first prong 212' and the second prong 212" may be inbuilt with the filter material 204 or may be attached using an attachment mechanism or glue to the filter material 204. For example, at least a portion of the first prong 212' and the second prong 212" may be metallic linings along the inside surface 1202 of the filter material 204. In another aspect, the first prong 212' and the second prong 212" could be attached by being molded into a center tube (not shown) of the filter 200. The center tube may have slots for the first prong 212' and the second prong 212" to snap into or holes for the first prong 212' and the second prong 212" to be inserted to. In yet another aspect, the first prong 212' and the second prong 212" could be glued inside the center tube.

Figure 13:
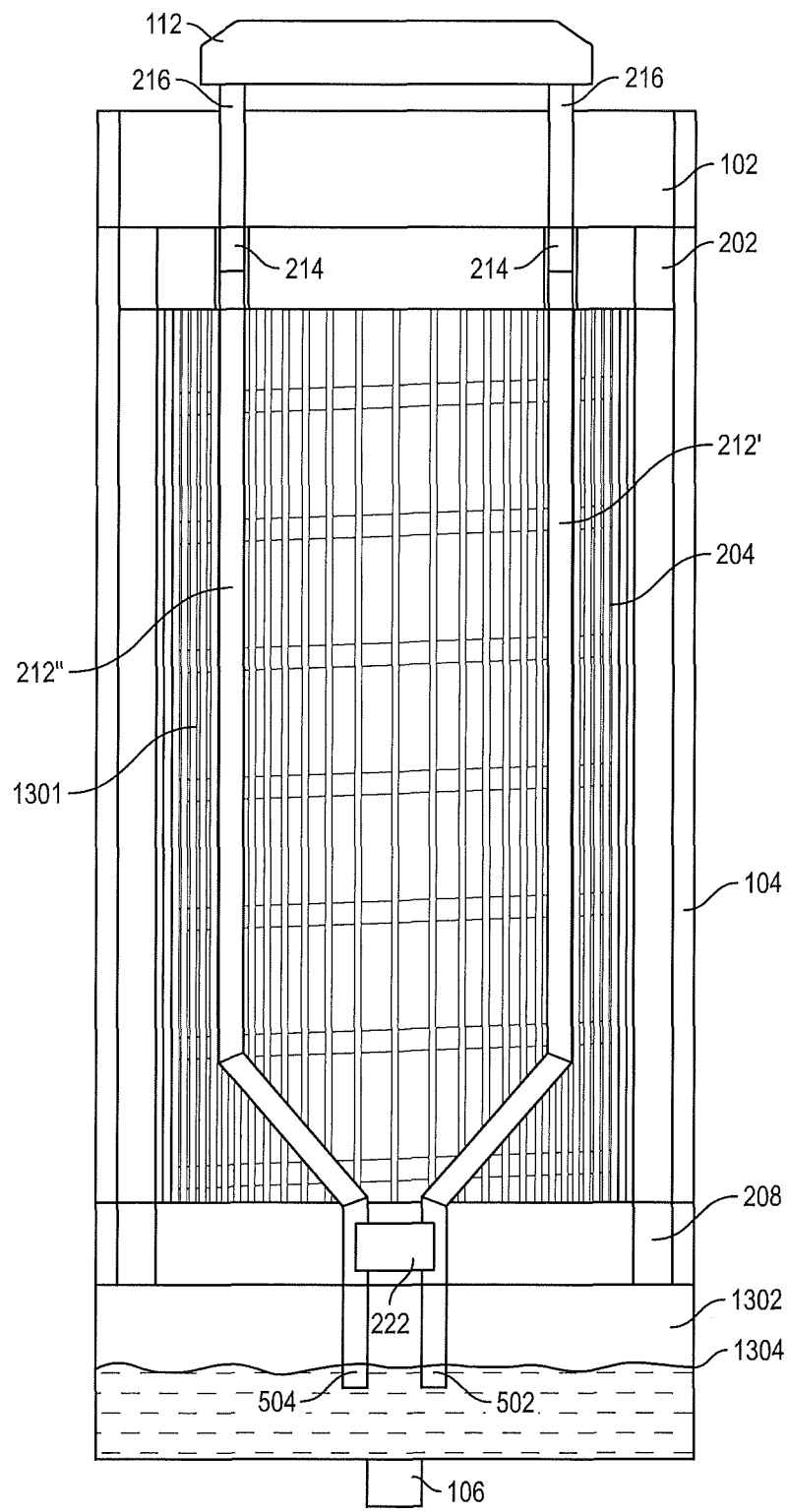
FIG. 13 illustrates the probe placed on an outside surface of the filter, in accordance with an aspect of this disclosure.

Referring to FIG. 13, the first prong 212' and the second prong 212" are illustrated to reside on an outside surface 1301 of the filter material 204 in a cutout view of the fuel water separator 100, in accordance with an aspect of this disclosure. The first prong 212' and the second prong 212" may couple to the spacing element 222 on the bottom end cap 208. When the filter material 204 is removed, the ends 502, 504 may remain with the bottom end cap 208 but the first prong 212' and the second prong 212" may be removed with the filter material 204. When a new filter material similar to the filter material 204 is inserted, a new pair of prongs similar to the first prong 212' and the second prong 212" may be aligned to connect to the sensor 112 via the pair of connectors 214 at the top end cap 202 of the filter 200. In this aspect, the first prong 212' and the second prong 212" may be metallic linings on the outside surface 1301 of the filter material 204. It is to be noted that in another aspect, the filter material 204 may combine the aspects illustrated in FIGS. 12-13 where the probe 212 may exist inside the filter 200, outside the filter 200, or both.

In one aspect, FIG. 13 illustrates the bowl 1302 having water at a level 1304 collected below the bottom end cap 208 and below the housing 104. When the level 1304 in the bowl 1302 reaches a predetermined threshold level, the ends 502, 504 come in contact with the water and complete the electrical circuit for the sensor 112. A current may then pass along first prong 212' and the second prong 212" and the sensor 112 may provide an output signal to indicate that the drain 106 needs to be opened for the bowl 1302 to empty, and/or the filter 200 needs to be replaced.

INDUSTRIAL APPLICABILITY

An aspect of the present disclosure is applicable generally to separating water and/or other impurities from fuel using the fuel water separator 100, and more particularly to a method for providing the fuel water separator 100 having the sensor 112 and the filter 200. Conventionally, fuel-water separators (FWS) have a water-in-fuel-filter ("Wiff") sensor, which indicates whether a bowl at the bottom of the filter is full of water and needs to be drained. The sensor is attached by a wire to the bottom of the filter. This sensor has to be disconnected from the filter and reconnected each time when the new filter is installed. In addition to the fact that it can be a hassle to remove/install the sensor, conventional fuel-water separators in which the sensor has to be disconnected and then reconnected have several drawbacks including that sometimes the sensor is not reattached, and the length of the wire given may make it challenging to install/remove the sensor. The aspects of the present disclosure overcome these and other drawbacks.

Figure 14:
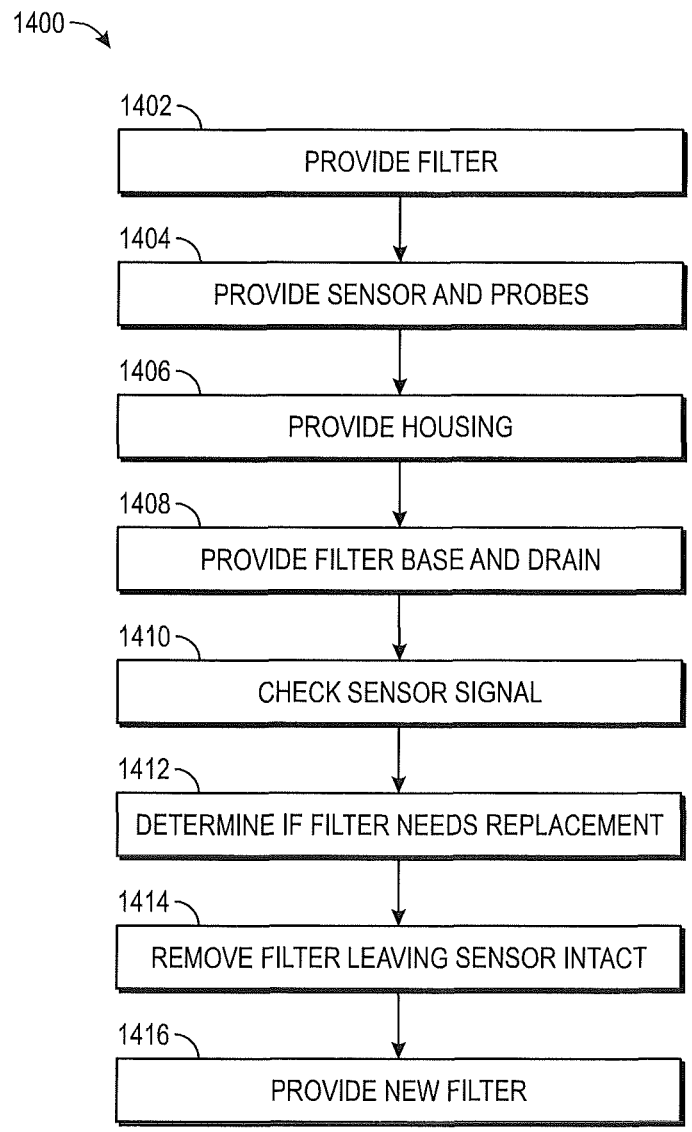
FIG. 14 illustrates a flowchart for a method of providing the fuel water separator, in accordance with an aspect of this disclosure.

FIG. 14 presents a flowchart of a process or a method 1400 for providing the fuel water separator 100, in accordance with an aspect of this disclosure. One or more processes of the method 1400 of may be skipped or combined as a single process, repeated several times, and the flow of operations in the method 1400 may be in any order not limited by the specific order illustrated in FIG. 14. For example, various operations may be moved around in terms of their respective orders, or may be carried out in parallel with one or more other operations. Further, the functioning or functionalities of the fuel water separator 100 are not affected by an order in which the aspects discussed in FIGS. 1-14 are implemented, and such an order of implementation is by way of example only and not by way of limitation.

The method 1400 may begin in an operation 1402 where the filter 200 may be provided. The filter 200 may be provided by assembling the top end cap 202, the bottom end cap 208, and the filter material 204 in between the top end cap 202 and the bottom end cap 208. For example, the filter material 204 may be in a shape of an annular cylinder that is placed in the first region 404 of the bottom end cap 208 and a similar region (not shown) in the top end cap 202.

In an operation 1404, the sensor 112 may be provided. In one aspect, the sensor 112 may be provided in respective recesses or cutouts in the filter base 102, and may be coupled to the top end cap 202. The sensor 112 may be provided such that when the filter 200 is to be replaced, the sensor 112 is not removed from the fuel water separator 100. Further in the operation 1404, the probe 212 may be provided. For example, the probe 212 may be provided to be coupled to the sensor 112 and the bottom end cap 208, as discussed with respect to FIGS. 1-13. Further, the probe 212 may be provided such that a part of the conductive element of the probe 212 is on or inside the filter material 204, as discussed for example with respect to FIGS. 12-13.

In an operation 1406, the housing 104 may be provided to accommodate the filter 200. The housing 104 may attach to the filter 200 at the top end cap 202 and the bottom end cap 208 and may include space for the probe 212. In one aspect, the housing 104 may be provided with the pair of ducts 804' and 804" to accommodate the pair of prongs 212' and 212", respectively, of the probe 212.

In an operation 1408, after the housing 104 has been assembled, for example, as illustrated in FIG. 1, the filter base 102 and the drain 106 may be provided. In one aspect, the filter base 102 may couple to the housing 104 via the tab 702 near the top end cap 202 of the filter 200. The drain 106 may be provided with the channel 106a and the screw 106b. The channel 106a may be provided to drain out water and/or other impurities present in the fuel and/or fuel mixture entering the inlet 108 of the filter base 102.

In an operation 1410, upon assembly of the fuel water separator 100, the sensor 112 may be turned on. An output of the sensor 112 may be checked to determine a state of the filter 200 and an amount or level of water collected under the bottom end cap 208. For example, the ends 502, 504 of the pair of prongs 212', 212", respectively, may contact water or other fluid collected under the bottom end cap 208. As a result, the electrical path to the sensor 112 may be completed and the sensor 112 may output a visual signal (e.g., a light emitting diode output).

In an operation 1412, based upon the signal emitted by the sensor 112, a technician may check and determine if the filter 200 should be replaced or removed for cleaning or maintenance.

In an operation 1414, the filter 200 and/or the filter material 204 may be removed leaving the sensor 112 intact with the filter base 102. Since the sensor 112 is left untouched, the sensor 112 may not need to be calibrated, repositioned, or reassembled at all or as often.

In an operation 1416, a new filter may be provided. The housing 104 and the filter base 102 may then be reattached after the new filter has been provided such that the fuel water separator 100 may be operational.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A fuel water separator, comprising:
   a filter having a top end cap and a bottom end cap;
   a sensor coupled to the top end cap of the filter; and
   a probe coupled to the sensor and to a spacing element on the bottom end cap, said probe positioned outside the filter between the top end cap and the bottom end cap.

2. The fuel water separator of claim 1, wherein the sensor is arranged to remain in the fuel water separator when the filter is removed.

3. The fuel water separator of claim 1, said probe including a pair of prongs, wherein the pair of prongs are separated by the spacing element on the bottom end cap and are coupled to the sensor at a pair of protrusions on the top end cap by a pair of connectors.

4. The fuel water separator of claim 1 further comprising:
   a housing accommodating the probe, wherein when the filter is removed, the probe is arranged to remain inside the housing.

5. The fuel water separator of claim 4, wherein the housing includes a standpipe that accommodates the probe.

6. The fuel water separator of claim 1 further comprising:
   a filter base coupled to the top end cap, said filter base including an inlet and an outlet for a fuel to enter and leave the filter, respectively; and
   a drain coupled to the bottom end cap.

7. A machine comprising the fuel water separator of claim 1.

8. The fuel water separator of claim 1, said probe including a pair of prongs, wherein the pair of prongs have a natural spring set, a first prong being arranged to be separated from a second prong by a spacing element on the bottom end cap when the filter is present in the fuel water separator, the first prong being arranged to be in contact with the second prong when the filter is removed from the fuel water separator.

9. The fuel water separator of claim 1, said probe including a pair of prongs, wherein the pair of prongs are insulated when placed inside a housing of the fuel water separator, said housing being conductive.

* * * * *